(12) United States Patent
Ross et al.

(10) Patent No.: US 10,926,491 B2
(45) Date of Patent: Feb. 23, 2021

(54) ROLLER DEVICE WITH TAILORABLE COMPLIANCE FOR AUTOMATED FIBER PLACEMENT

(71) Applicant: Spirit AeroSystems, Inc., Wichita, KS (US)

(72) Inventors: William Tod Ross, Wichita, KS (US); Steven R. Blencoe, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 249 days.

(21) Appl. No.: 15/878,736

(22) Filed: Jan. 24, 2018

(65) Prior Publication Data

US 2019/0224927 A1  Jul. 25, 2019

(51) Int. Cl.
*B29C 70/38* (2006.01)

(52) U.S. Cl.
CPC .......... *B29C 70/382* (2013.01); *B29C 70/384* (2013.01); *B29C 70/388* (2013.01)

(58) Field of Classification Search
CPC ............................. B29C 70/382; B29C 70/384
See application file for complete search history.

(56) References Cited

U.S. PATENT DOCUMENTS

| | | | |
|---|---|---|---|
| 1,271,194 A | 7/1918 | Meyer | |
| 1,768,044 A * | 6/1930 | Fisk | B21B 39/008 384/380 |
| 2,367,088 A * | 1/1945 | Benson | D01H 5/74 19/295 |
| 3,091,990 A * | 6/1963 | McVittie | F16B 13/00 411/27 |
| 3,467,450 A * | 9/1969 | Schmidt | F16C 23/10 384/447 |
| 3,603,416 A * | 9/1971 | Spurlin | B65G 39/04 177/1 |
| 3,832,749 A * | 9/1974 | Hawk | B05C 17/02 15/230.11 |
| 3,853,170 A * | 12/1974 | Barettella | A47H 1/102 160/323.1 |
| 4,237,592 A * | 12/1980 | Kuge | G03G 15/101 15/230.11 |

(Continued)

OTHER PUBLICATIONS

European Search Report for Application No. 19152492.5-1019; dated Jun. 14, 2019 and all references cited therein.

*Primary Examiner* — Leith S Shafi
*Assistant Examiner* — Nicholas R Krasnow
(74) *Attorney, Agent, or Firm* — Hovey Williams LLP (57) ABSTRACT

A roller device for use in an automated fiber placement process for creating composite parts on a contoured tool. A helical spring provides a bendable axle, and a roller cover fits over the spring axle. A tension mechanism is arranged through the spring axle along a centerline axis, and is adjustable to control a bendability of the spring axle so as to more closely conform to particular contours of the tool. The tension mechanism may include a cable extending through the spring axle, a threaded portion at an end of the cable, and a screw received within the threaded portion and turnable to adjust a length of the tension mechanism and thereby adjust the bendability of the spring axle. The tension mechanism may be adjustable manually, semi-manually with a motor controlled by a user, or automatically with a motor controlled by an electronic controller.

17 Claims, 5 Drawing Sheets

(56) References Cited

U.S. PATENT DOCUMENTS

| | | | | |
|---|---|---|---|---|
| 4,460,433 A | | 7/1984 | Boyd | |
| 4,571,832 A | * | 2/1986 | Hendy | B26B 3/03 30/280 |
| 5,251,986 A | * | 10/1993 | Arena | F16C 11/045 384/208 |
| 5,395,447 A | * | 3/1995 | Wu | B05C 1/0813 118/227 |
| 7,100,238 B2 | * | 9/2006 | McCauley | A46B 5/0062 15/144.1 |
| 8,042,594 B2 | * | 10/2011 | Miller | B29C 70/382 156/358 |
| 8,191,596 B2 | * | 6/2012 | Hamlyn | B29C 70/384 156/441 |
| 8,752,233 B2 | * | 6/2014 | Vice | E01H 15/00 15/230.11 |
| 8,893,758 B2 | * | 11/2014 | Genssen | B29C 70/388 156/433 |
| 9,073,198 B1 | * | 7/2015 | Menius | B25G 1/02 |
| 9,889,610 B2 | * | 2/2018 | DesJardien | B29C 70/30 |
| 2003/0136643 A1 | * | 7/2003 | Mayerberg, II | B65G 15/20 198/620 |
| 2003/0146586 A1 | * | 8/2003 | Hurwitz | A63C 17/0066 280/11.221 |
| 2008/0073039 A1 | * | 3/2008 | Gyngell | B60J 1/2033 160/313 |
| 2008/0203130 A1 | * | 8/2008 | Kerschbaumer | D21G 1/02 226/108 |
| 2011/0247751 A1 | | 10/2011 | Steyer et al. | |
| 2013/0202366 A1 | * | 8/2013 | Maas | A01B 45/026 405/271 |
| 2014/0083620 A1 | * | 3/2014 | Caffiau | B29C 70/38 156/433 |
| 2016/0251786 A1 | * | 9/2016 | Ichikawa | D04C 3/18 87/55 |
| 2018/0334854 A1 | * | 11/2018 | Chen | F16F 9/3278 |

\* cited by examiner

ROLLER DEVICE WITH TAILORABLE COMPLIANCE FOR AUTOMATED FIBER PLACEMENT

FIELD

The present invention relates to roller devices for use in automated fiber placement processes for creating composite parts, and more particularly, embodiments concern a compliable roller device employing a helical spring as an axle to provide more uniform application pressure over a range of tool contours and force levels.

BACKGROUND

Automated Fiber Placement (AFP) machines are used to automate the fabrication of composite parts by simultaneously applying multiple narrow, parallel strips of unidirectional composite fiber, or tape, to tools that define the geometries of parts to be fabricated. A typical AFP machine may lay down eight or sixteen individual strips at once, with the width of each strip being one-quarter inch or one-half inch, such that the combined width of material applied at once may be between two inches and eight inches. However, other strip widths or overall widths may be encountered.

The strips are applied to the tool using a roller. The typical AFP application roller has a rigid core and is covered by a surface layer of rubber. The rubber allows the roller to somewhat conform to the contours of the tool, but conformance is limited due to the rigid inner core. Furthermore, even when the flexibility of the rubber is sufficient to maintain contact across the width of the roller, the application pressure will not be uniform. The pressure will be highest where the rubber has been most deformed by the contour, and lowest where it has been least deformed. This is problematic because only one application pressure is ideal, and yet only one point on the roller may provide the ideal application pressure. All other points on the roller may have an application pressure that is necessarily too high or too low for optimal transfer and compaction of the strip onto the tool.

Another prior art approach is to use multiple, separate, closely-spaced rollers. With this approach, there may be a separate roller for each strip of composite material being applied. Thus, there may be eight or sixteen individual rollers, each with its own mechanism for adjusting force. While in theory this would allow uniform pressure and a greater ability to conform to varying contours, in practice these designs are complex, prone to the accumulation of resin between the rollers, and difficult to maintain in alignment with the composite strips.

Another prior art approach is to use a single wide roller with a flexible axle. This requires less conformance from the surface rubber layer because the entire roller is able to bend in order to accommodate the contours it encounters. However, it is not possible to achieve uniform pressure across the roller width with this design except, potentially, for a certain contour and force for which the roller design is optimized.

This background discussion is intended to provide information related to the present invention which is not necessarily prior art.

SUMMARY

Embodiments address the above-described and other problems by providing a compliable roller device for use in an automated fiber placement process for creating composite parts on a contoured tool, with the roller device employing a helical spring as an axle to provide more uniform application pressure over a range of tool contours and force levels.

In a first embodiment, a roller device is provided for use in an automated fiber placement process involving a tool having a contour. The roller device may broadly comprise a helical spring axle, a roller cover, and a tension mechanism. The helical spring axle may have a plurality of turns of a spring material arranged substantially cylindrically along a centerline axis, and configured to function as a bendable axle. The roller cover may have a hollow interior, and may be configured to receive the helical spring axle within the hollow interior. The tension mechanism may be arranged through the helical spring axle along the centerline axis, and may be adjustable to control a bendability of the bendable axle.

Various implementations of the first embodiment may include any one or more of the following features. The roller cover may have a length and a thickness, and the thickness may vary over the length, and the thickness may be greater at a center of the length than at an end of the length. The tension mechanism may be adjustable to a particular length to prevent the helical spring axle from lengthening beyond a particular length value that corresponds to a particular bend radius for conforming to the contour of the tool. The tension mechanism may include a cable extending through the helical spring axle, a threaded portion at an end of the cable, and a screw received within the threaded portion and turnable to adjust a length of the cable and thereby adjust the bendability of the bendable axle. The roller device may further include first and second end caps configured to maintain the cable centrally within the helical spring axle, and may further include one or more additional spacers configured to maintain one or more intermediate portions of the cable centrally within the helical spring axle.

The tension mechanism may be manually adjustable as the roller device moves over the tool. The tension mechanism may include a motor, and the tension mechanism may be semi-manually adjustable using the motor. The tension mechanism may be automatically adjustable as the roller device moves over the tool. The roller device may further include an actuator, a servo motor configured to actuate the actuator, and an electronic controller configured to control the servo motor and actuation of the actuator and thereby automatically adjust the tension mechanism as the roller device moves over the tool.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments concern a compliable roller device for use in an automated fiber placement process for creating composite parts on a contoured tool, with the roller device employing a helical spring as an axle to provide more uniform application pressure over a range of tool contours and force levels. Embodiments advantageously avoid the complexity and other limitations of multiple or segmented roller approaches while providing a greater ability to conform to varying contours with more uniform pressure.

Figure 1:
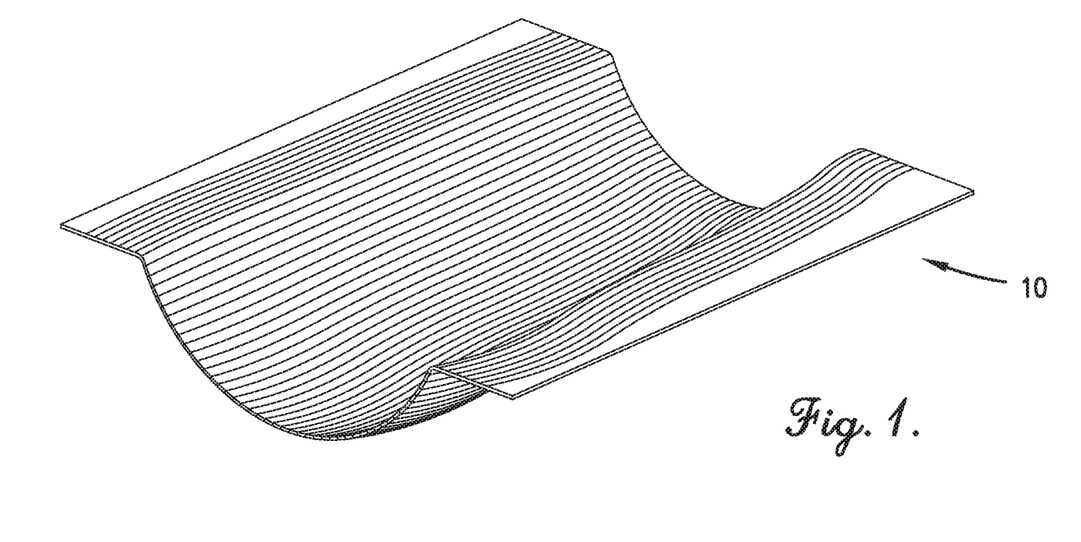
FIG. 1 is a fragmentary perspective view of an exemplary contoured surface of a tool for creating a composite part.
Figure 2:
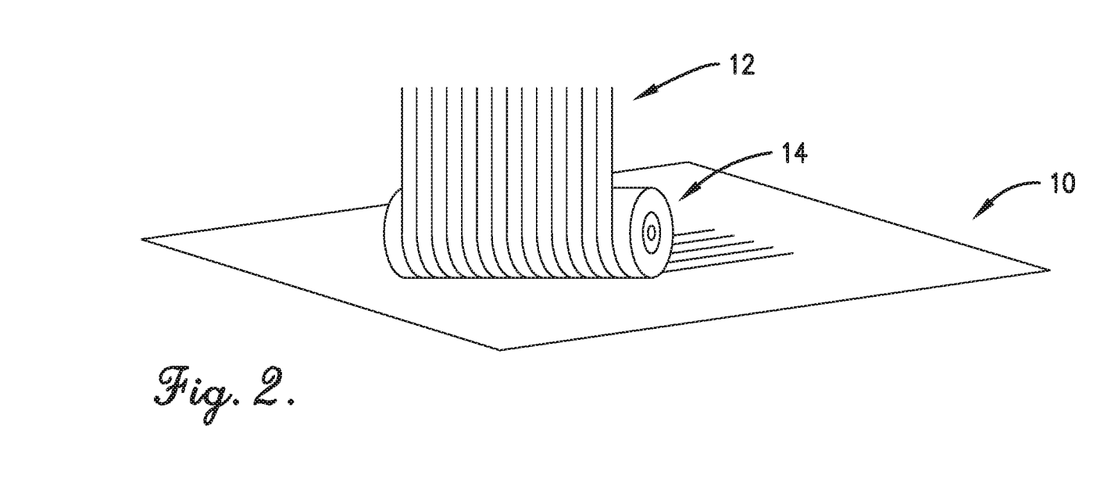
FIG. 2 is a fragmentary perspective view of a portion of an exemplary automated fiber placement machine laying down fibers on the exemplary surface of the tool of FIG. 1, wherein the automated fiber placement machine includes a roller.
Figure 3:
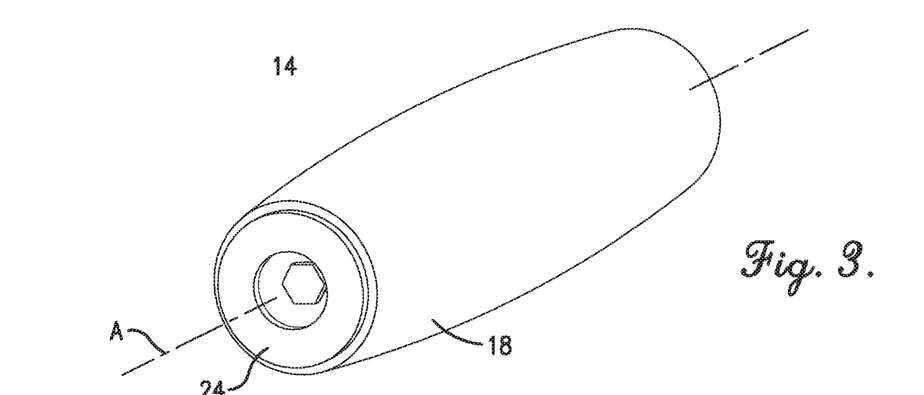
FIG. 3 is an isometric view of an embodiment of a roller device which may be used with the machine of FIG. 2.
Figure 4:
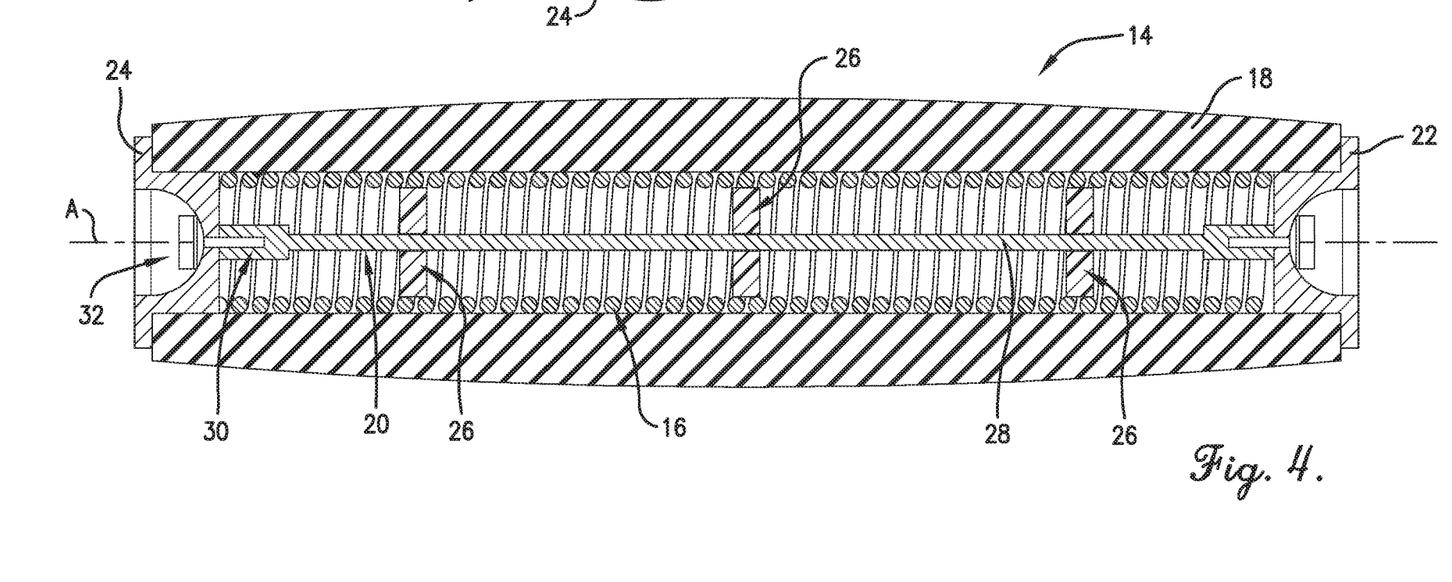
FIG. 4 is a cross-sectional elevation view of the roller device of FIG. 3.
Figure 5:
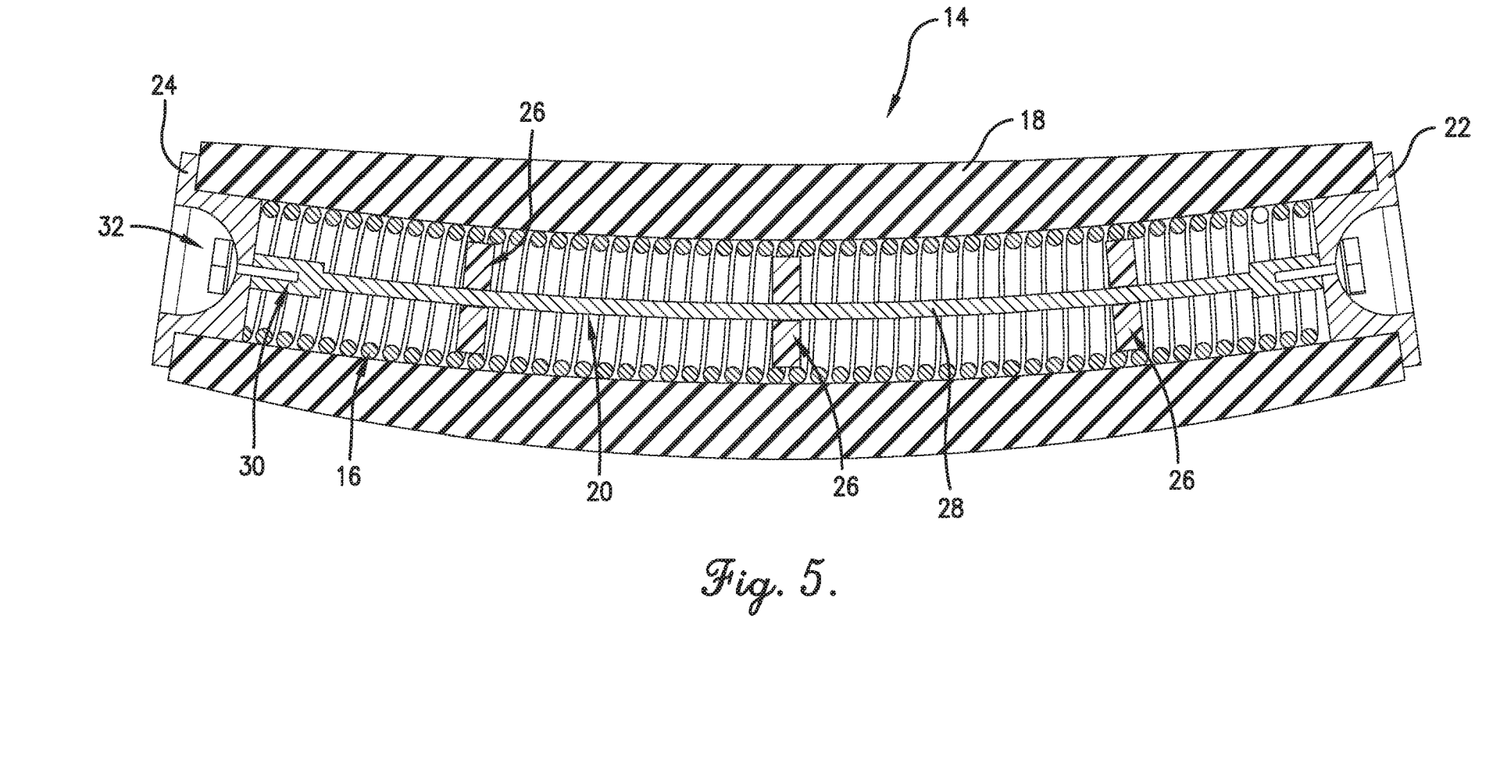
FIG. 5 is a cross-sectional elevation view of the roller device of FIG. 3, wherein the roller device is shown bending to conform to a contour.
Figure 6:
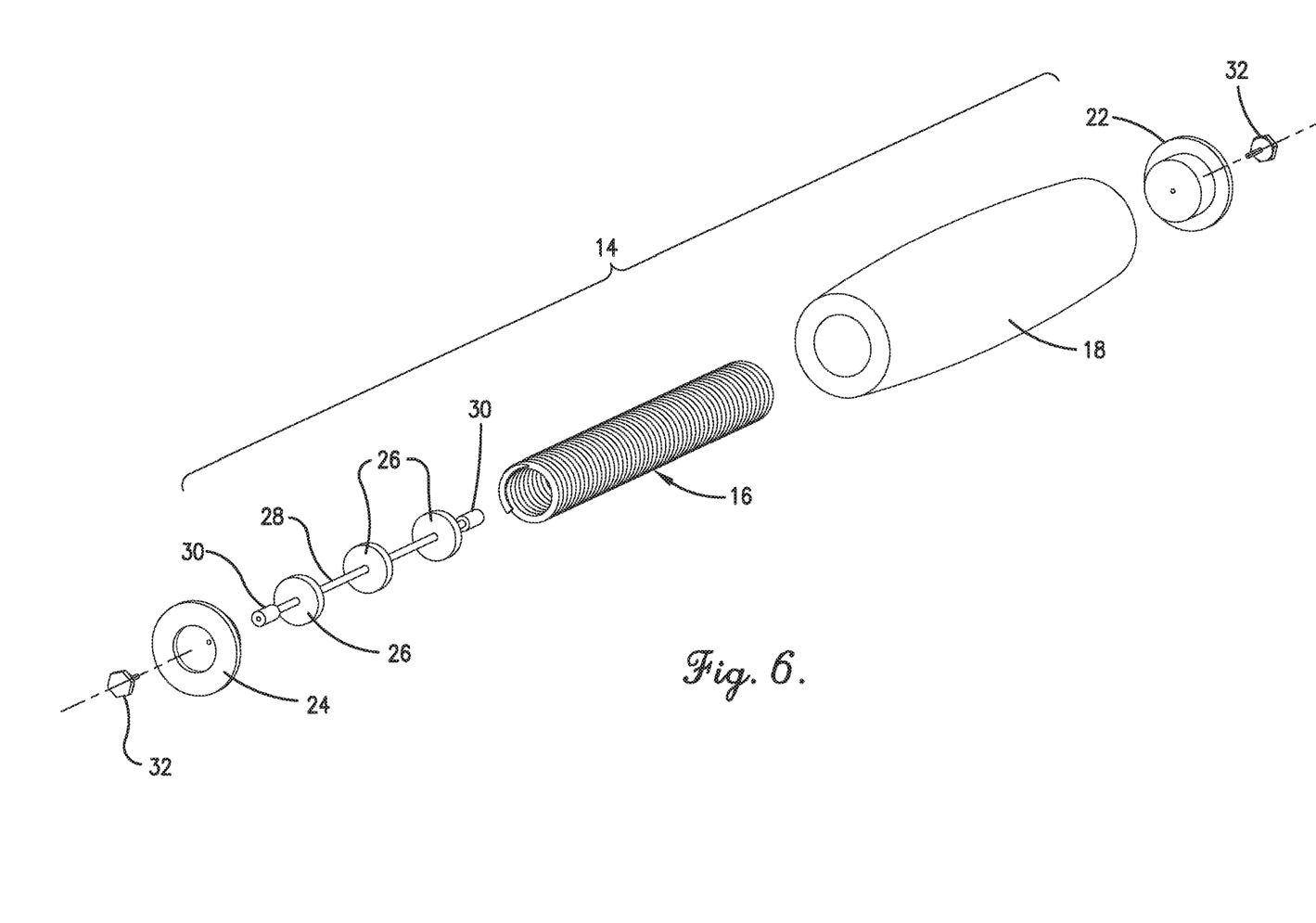
FIG. 6 is an exploded isometric view of certain components of the roller device of FIG. 3.

Referring to FIG. 1, an exemplary contoured surface of a tool 10 is shown for creating composite parts. The composite parts may be, for example, panels or other parts used in the construction of aircraft or other vehicles, and the tool 10 may be of generally conventional design and construction for such purposes. Referring also to FIG. 2, a portion of an exemplary automated fiber placement machine is shown for laying down fibers 12 on the surface of the tool 10. The automated fiber placement machine may include a roller device 14.

Referring to FIGS. 3-6, an embodiment of the roller device 14 may broadly include a helical spring axle 16, a roller cover 18, a tension mechanism 20, and first and second end caps 22,24. The helical spring 16 may include multiple turns of a spring material arranged substantially cylindrically along a centerline axis A, and may be configured to function as a bendable axle. In a free state, adjacent turns of the helical spring axle 16 may be in contact with or at least relatively close to one another. Employing the helical spring 16 as an axle allows the overall roller device 14 to more easily flex and follow, or comply with, the contours of the tool 10. The roller cover 18 may be a hollow cylinder of rubber or a similarly relatively soft or conformable natural or synthetic material, and may be configured to fit over and receive the helical spring axle 16 within its hollow interior. The thickness of the roller cover 18 may vary over its length, and in one implementation, the roller cover 18 may be relatively thicker at its center than at its ends.

The tension mechanism 20 may be arranged through the center of or at least generally centrally through the helical spring axle 16 along the centerline axis A, and may be adjustable to increase or decrease the bendability of the helical spring axle 16 as desired or needed. As the helical spring axle 16 bends, portions of the turns on the inner radius or compression side of the bend are unable to move any closer to each other because they are already in or quickly come into contact. However, portions of the turns on the outer radius or tension side of the bend are able to separate from each other. Thus, as the helical spring axle 16 bends to match a particular contour of the tool 10, the distance along the centerline axis A from one end of the helical spring axle 16 to the other end must increase. The tension mechanism 20 is adjustable to a particular length to prevent the helical spring axle 16 from lengthening beyond a pre-determined length value that corresponds to a desired bend radius of the roller device 10 in order to conform to the contours of the tool 10. The first and second end caps 22,24 may maintain the tension mechanism 20 or at least a portion thereof centered in or at least generally centrally within the helical spring axle 16. Further, additional end or intermediate bushings or spacers 26 may be used to further maintain the tension mechanism 20 or at least a portion thereof centered in or at least generally centrally within the helical spring axle 16.

In one implementation, the tension mechanism 20 may take the form of a cable 28 having a threaded portion 30 at one or both ends. A screw 32 may be screwed into each threaded portion 30 of the cable 28, and turning the screw 32 may vary the effective length of the cable 28, and thereby vary the degree of bending of the helical spring axle 16 that is possible without landing on the screw 32 and preventing further bending. However, it will be understood that the tension mechanism 20 may take substantially any suitable form for accomplishing the intended function.

Figure 7:
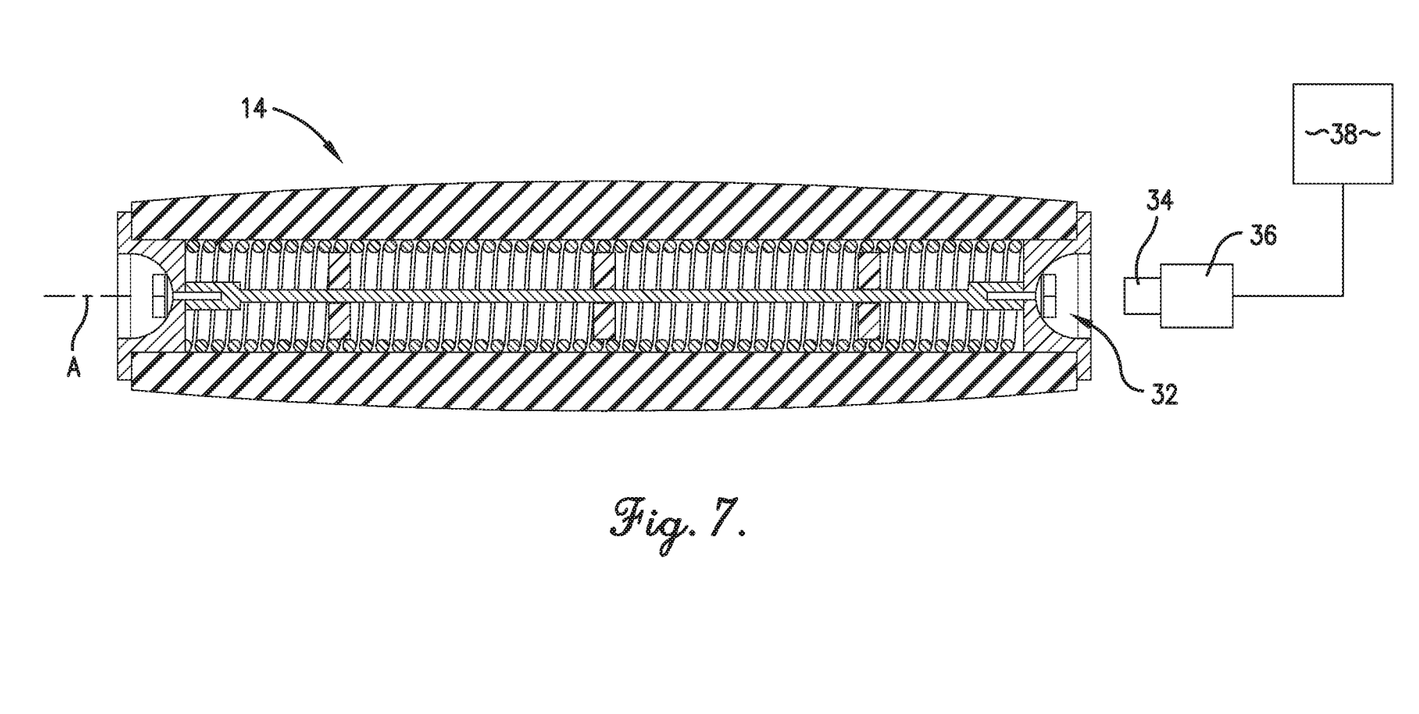
FIG. 7 is a cross-sectional elevation view of an implementation of the roller device which is automatically adjustable.

In one implementation, the tension mechanism 20 may be manually adjustable by manually turning the screws 32 to accommodate different contours. However, repeatedly manually adjusting the tension mechanism 20 may require repeatedly stopping the process to perform the adjustments, so in an additional or alternative implementation, shown in FIG. 7, the tension mechanism 20 may be automatically adjustable. In this implementation, the roller device 14 may further include an actuator 34 driven by a servo motor 36 for performing the adjustment, and may further include an electronic controller 38 for controlling the servo motor 36. The electronic controller may be programmed to automatically adjust based on known contours of the tool, or the electronic controller may be programmed to sense contours and automatically adjust in response to the sensed contours of the tool. In this manner, the tension mechanism 20 may be quickly and/or continuously adjusted as needed to accommodate changing contours during the AFP process, thereby avoiding periodic interruptions of the process for manual adjustments. Thus, the tension mechanism 20 may be adjustable manually, semi-manually with the motor 36 controlled by a user, or automatically with the motor 36 controlled by the electronic controller 38.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A roller device for use in an automated fiber placement process involving a tool having a contour, the roller device comprising:
    a helical spring axle having a plurality of turns of a spring material arranged substantially cylindrically along a centerline axis, and the axle bendable along the centerline axis to conform to the contour of the tool;
    a roller cover having a hollow interior and a length, and the helical spring axle housed within the hollow interior and physically supporting the roller cover along the length, and bending with the helical spring axle,
    wherein when the helical spring axle and the roller cover bend, a central portion of both the helical spring axle and the roller cover curve away from the centerline axis in one direction to form a bend radius; and
    a tension mechanism arranged through the helical spring axle along the centerline axis, and adjustable to control bending of the helical spring axle and the roller cover, wherein the tension mechanism is adjustable to limit the bend radius of the helical spring axle and the roller cover so that the bend radius does not exceed a predetermined bend radius corresponding to the contour of the tool.

2. The roller device of claim 1, wherein the thickness is greater at a center of the length and decreases from the center of the length to an end of the length.

3. The roller device of claim 1, wherein the tension mechanism includes—
    a cable extending through the helical spring axle;
    a threaded portion at an end of the cable; and
    a screw received within the threaded portion and turnable to adjust a length of the cable and thereby adjust the bendability of the helical spring axle and the roller cover.

4. The roller device of claim 3, further including first and second end caps maintaining the cable centrally within the helical spring axle.

5. The roller device of claim 4, further including one or more additional spacers maintaining one or more intermediate portions of the cable centrally within the helical spring axle.

6. The roller device of claim 1, wherein the tension mechanism is manually adjustable as the roller device moves over the tool.

7. The roller device of claim 1, wherein the tension mechanism includes a motor, and the tension mechanism is semi-manually adjustable using the motor.

8. The roller device of claim 1, wherein the tension mechanism is automatically adjustable as the roller device moves over the tool.

9. The roller device of claim 8, further including—
    an actuator;
    a servo motor actuating the actuator; and
    an electronic controller controlling the servo motor and actuation of the actuator and thereby automatically adjusting the tension mechanism as the roller device moves over the tool.

10. A roller device for use in an automated fiber placement process involving a tool having a contour, the roller device comprising:
    a helical spring axle having a plurality of turns of a spring material arranged substantially cylindrically along a centerline axis, and the axle bendable along the centerline axis to conform to the contour of the tool;
    a roller cover having a hollow interior and a length, and the helical spring axle housed within the hollow interior and physically supporting the roller cover along the length, and bending with the helical spring axle,
    wherein when the helical spring axle and the roller cover bend, a central portion of both the helical spring axle and the roller cover curve away from the centerline axis in one direction to form a bend radius; and
    a tension mechanism including—
        a cable extending through the helical spring axle,
        a threaded portion at an end of the cable, and
        a screw received with the threaded portion and turnable to adjust a length of the cable and thereby adjust the bending of the helical spring axle and the roller cover, wherein turning the screw to tighten the cable limits the bend radius of the helical spring axle and the roller cover so that the bend radius does not exceed a predetermined bend radius corresponding to the contour of the tool.

11. The roller device of claim 10, further including first and second end caps maintaining the cable centrally within the helical spring axle.

12. The roller device of claim 11, further including one or more additional spacers maintaining one or more intermediate portions of the cable centrally within the helical spring axle.

13. The roller device of claim 10, wherein the screw is manually turnable.

14. The roller device of claim 10, wherein the tension mechanism includes a motor, and the screw is semi-manually turnable using the motor.

15. The roller device of claim 10, wherein the screw is automatically turnable as the roller device moves over the tool.

16. The roller device of claim 8, further including—
    an actuator coupled with the screw;
    a servo motor actuating the actuator; and
    an electronic controller controlling the servo motor and actuation of the actuator and thereby automatically turning the screw as the roller device moves over the tool.

17. A roller device for use in an automated fiber placement process involving a tool having a contour, the roller device comprising:
    a helical spring axle having a plurality of turns of a spring material arranged substantially cylindrically along a centerline axis, and the axle bendable along the centerline axis to conform to the contour of the tool;
    a roller cover having a length and a thickness, wherein the thickness is greater at a center of the length than at an end of the length, and having a hollow interior, and receiving the helical spring axle within the hollow interior and the helical spring axle physically supporting the roller cover along the length,
    wherein when the helical spring axle and the roller cover bend, a central portion of both the helical spring axle and the roller cover curve away from the centerline axis in one direction to form a bend radius; and a tension mechanism including—
- a cable extending through the helical spring axle,
- a threaded portion at an end of the cable, and
- a screw received with the threaded portion and turnable to adjust a length of the tension mechanism and thereby adjust the bending of the helical spring axle,
- an actuator coupled with the screw,
- a servo motor actuating the actuator, and
- an electronic controller controlling the servo motor and actuation of the actuator and thereby automatically turning the screw as the roller device moves over the tool,
- wherein turning the screw to tighten the cable limits the bend radius of the helical spring axle and the roller cover so that it does not exceed a predetermined bend radius corresponding to the contour of the tool; and first and second end caps maintaining the cable centrally within the helical spring axle, and one or more additional spacers maintaining one or more intermediate portions of the cable centrally within the helical spring axle.

\* \* \* \* \*